Jan. 22, 1963 M. E. HOMAN 3,075,091

DATA LATCHING SYSTEMS

Filed Feb. 3, 1960 3 Sheets-Sheet 1

INVENTOR
MERLE E. HOMAN

BY Mitchell & Bechert

ATTORNEY

Jan. 22, 1963 M. E. HOMAN 3,075,091

DATA LATCHING SYSTEMS

Filed Feb. 3, 1960 3 Sheets-Sheet 2

3,075,091

DATA LATCHING SYSTEMS

Merle E. Homan, Poughkeepsie, N.Y., assignor to International Business Machines Corporation, New York, N.Y., a corporation of New York Filed Feb. 3, 1960, Ser. No. 6,388
19 Claims. (Cl. 307—88.5)

The present invention relates to improvements in data latching systems, and more particularly to improvements for insuring against the occurrence of undesired race conditions therein.

Data latching systems for use with digital computer devices have been devised wherein logic "or" and logic "and" circuitry is employed to effect the data latching function. A logic "or" circuit is characterized by having two (or more) inputs and wherein an output signal is produced when an input signal is received on at least one of its input leads. A logic "and" circuit is characterized by having two (or more) inputs and wherein an output signal is produced when, and only when, input signals are received on both (or all) input leads.

A typical data latching system ordinarily comprises a first and a second logic "and" circuit, and a logic "or" circuit. The outputs of the first and second "and" circuits are connected to the "or" circuit, and the output of the "or" circuit constitutes the output of the system. One of the inputs of the first "and" circuit is made responsive to a signal X representative of the input data for the system. One of the inputs of the second "and" circuit is made responsive to a latching gate signal G. The other input of the first "and" circuit is made responsive to the complement $\overline{G}$ of this latching gate signal. The circuit is completed by making the other input of the second "and" circuit responsive to the output of the "or" circuit.

The operation of this system may be divided into two time intervals. During the first time interval, the input data signal X alone is applied to the system. This provides a first input for the first "and" circuit. A second input for the first "and" circuit is also provided in the form of the complement signal $\overline{G}$ since the latching gate signal G is not applied during this first time interval. Accordingly, the first "and" circuit is operated and an output signal therefrom is applied to the "or" circuit. This produces an output signal 0 from the "or" circuit which is the output of the system and representative of the reception by the system of the input data signal X. Furthermore, part of the output signal 0 is fed back to provide a first input for the second "and" circuit. The second "and" circuit does not operate, however, due to the absence of the latching gate signal G.

During the second time interval, the latching gate signal G is applied to the system. This removes the complement signal $\overline{G}$ from the first "and" circuit, thus removing the input formerly applied to the "or" circuit. However, the application of the latching gate signal G applies a second input to the second "and" circuit. This operates the second "and" circuit and, accordingly, provides an input to the "or" circuit, which replaces the removed input. In this way, the output signal 0 from the system is maintained, or latched, even if the input data signal X is removed; it is only essential that the latching gate signal G be present. Removal of the latching gate signal G returns the system to its original condition.

The system above-described forms the basis for a large number of other systems having a variety of functions. For example, escapement gates, exclusive "or" circuits, binary triggers, shift elements, and the like have been designed utilizing the principles of the data latching system. For that reason, the term data latching shall be defined in the specification and appended claims as including systems deriving therefrom.

A major problem in all such data latching systems is an inherent race condition. This race condition occurs at the inputs to the "or" circuit during the second time interval. It results from the fact that the input from the second "and" circuit must arrive at the "or" circuit prior to the removal of the input from the first "and" circuit in order for latching of the output signal to occur.

Accordingly, it is a primary object of the invention to provide means for insuring against the occurrence of race conditions in data latching systems.

It is a further object of the invention to provide a novel logical form of escapement gate.

It is another object of the invention to provide novel circuit configurations embodying the novel data latching circuit for performing one or more unique logical functions.

The invention eliminates racing by providing a third "and" circuit of at least the two-input type, the polarity of which is opposite to that of the other logic "and" circuits in the system. In addition, the following changes are made in the system. The complement $\overline{G}$ of the latching gate signal is removed from the first "and" circuit and applied as one of the inputs to the third "and" circuit. Part of the output of the first "and" circuit is applied to the third "and" circuit to provide the other input therefor. And to complete the system, the output of the third "and" circuit is substituted for the complement signal $\overline{G}$ as the other input for the first "and" circuit.

A complete understanding of the invention may be obtained from the following detailed description of means forming specific embodiments thereof, when read in conjunction with the appended drawings, in which.

Figure 1:
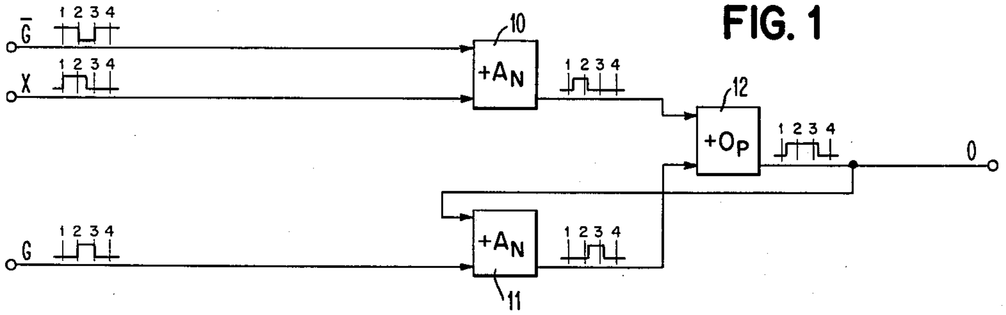
FIG. 1 is a logical block diagram of a data latching system of the prior art.

The data latching system of the prior art illustrated in FIG. 1 may be functionally divided into two logic "and" circuits 10 and 11 of the two-input type and a logic "or" circuit 12. The outputs of the 'and" circuits 10 and 11 are connected to the input of the "or" circuit, the output of the "or" circuit being the output of the system. One of the inputs of the "and" circuit 10 is made responsive to a signal X which is representative of the input data to be applied to the system. One of the inputs of the "and" circuit 11 is made responsive to a latching gate signal G. The other input of "and" circuit 10 is made responsive to the complement $\overline{G}$ of the signal G. And to complete the circuit, part of the output signal 0 is fed back into the system to provide the other input for "and" circuit 11.

It will be noted that the notation defining the "and" and "or" circuits in FIG. 1 is preceded by either a + or a — symbol. In this notation, a positive "and" or "or" circuit is characterized by being operative to produce a positive going output signal in response to the application of positive going signals which satisfy its logical requirements. A negative "and" or "or" circuit, on the other hand, is characterized by being operative to produce a negative going signal in response to the application of negative going signals which satisfy its logical requirements. In the embodiment of FIG. 1, positive "and" and "or" circuits are employed.

Logic "and" and "or" circuits suitable for use with the invention are now well known, and for a detailed discussion of such circuits, reference may be had to copending application Ser. No. 622,307, filed November 15, 1956, entitled Transistor Switching Circuits, in the name of H. S. Yourke and assigned to this assignee.

The operation of the data latching system of FIG. 1 will now be described in terms of a first and second time interval. In the drawing, appropriate waveforms are shown in proper time sequence. During the first time interval, the input data signal X alone is applied to the system as shown by the positive going waveform. This provides a first input for the "and" circuit 10. A second input for the "and" circuit 10 is also provided in the form of a complement signal $\overline{G}$ since the latching gate signal G is not applied during this first time interval. Accordingly, the "and" circuit 10 is operated and an output signal therefrom is applied to the "or" circuit 12. This produces the output signal 0 which is representative of the reception by the system of the input data signal X. Furthermore, part of the output signal 0 is fed back into the system to provide a first input for the "and" circuit 11. The "and" circuit 11 does not operate, however, due to the absence of the latching gate signal G.

During the second time interval, the latching gate signal G is applied to the system. This removes the complement signal $\overline{G}$ from the "and" circuit 10. The "and" circuit 10 thus becomes non-operative and the input signal which it applies to the "or" circuit 12 is removed. However, the application of the latching gate signal G to the "and" circuit 11 provides that "and" circuit with its second input. This operates the "and" circuit 11 and provides an input for the "or" circuit 12 which replaces the removed input. In this way, the output signal 0 is produced by the system, even if the input data signal X is removed, so long as the latching gate signal G is present. Thus, latching of the input data within the system has been effected. Removal of the latching gate signal G returns the system to its original condition.

It is evident from the operation above-described that in order for latching to occur, the output from "and" circuit 11 must be applied to the input of "or" circuit 12 before the output from "and" circuit 10 is removed therefrom. Thus, an undesirable race condition exists inherently in the data latching systems of the prior art. This condition makes extreme demands on the operating tolerances and affects substantially the reliability of these systems.

Figure 2:
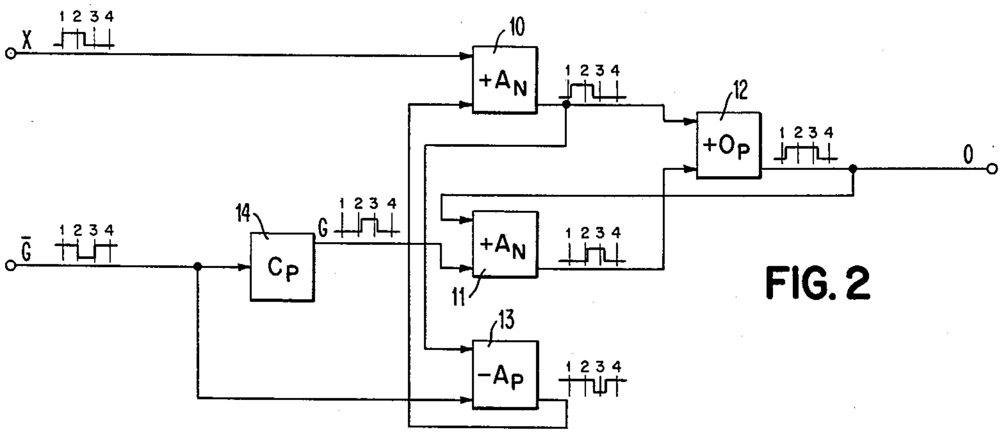
FIG. 2 is a logical block diagram of a data latching system in accordance with the invention.

It is the primary object of the present invention to provide means for insuring against the occurrence of race conditions in data latching systems. The novel arrangement for eliminating the racing condition is shown in FIG. 2. Component parts in FIG. 2 identical to those in FIG. 1 are similarly numbered. In this embodiment, the invention provides for the addition to the system of a logic "and" crcuit 13 of the two-input type and a convert circuit 14. It will be noted that the "and" circuit 13 is of opposite polarity, in this case negative, relative to the polarity of the circuits 10, 11 and 12. The convert circuit 14 is designed to convert an N level signal to a P level signal and produce at its upper output the complement of the signal applied to its input. The convert circuit therefore operates as an inverter as well as converting signal levels.

With these circuit additions, the following changes are made in the system. The complement signal $\overline{G}$ is applied to the convert circuit 14 to produce the latching gate signal G which is applied to the "and" circuit 11 as before. Furthermore, the complement signal $\overline{G}$ is removed from the "and" circuit 10 and is applied as one of the inputs at the "and" circuit 13. Part of the output of the "and" circuit 10 is applied to the "and" circuit 13 to provide the other input therefor. And to complete the system, the output of the "and" circuit 13 is substituted for the complement signal $\overline{G}$ as the other input for the "and" circuit 10.

The operation of the system of FIG. 2 may, again, be divided into a first time interval initiated by the application of the input data signal X alone, and a second time interval initiated by the application of the latching gate signal G. During the first time interval, the "and" circuit 10 is provided with a first input by the application of the input data signal X. Now, however, its second input is derived from the "and" circuit 13 through the following mechanism. The negative "and" circuit 13, as before described, requires two negative going input signals to produce a negative going output signal. Accordingly, it cannot produce a negative going output signal during the first time interval due to the application of the positive going complement signal $\overline{G}$. In its non-operative condition, it therefore provides a positive going output which is applied to the "and" circuit 10. In this way, the "and" circuit 10 produces an output signal which is applied to the "or" circuit 12. This produces the output signal 0 as required. The output signal 0 is, as before, fed back to provide a first input for the "and" circuit 11 which does not operate due to the absence of the latching gate signal G.

During the second time interval, the complement signal $\overline{G}$ is made negative, thereby producing the latching gate signal G. The now negative going nature of the complement signal $\overline{G}$ does not, however affect the output of the "and" circuit 10. This is because the output of the "and" circuit 10 is still positive and, therefore, prevents the output of the "and" circuit 13 from going negative. As a result, the output of the "and" circuit 10 remains positive, until the input data signal X drops off, thus providing a locked condition.

The application of the latching gate signal G to the "and" circuit 11 now provides that "and" circuit with its second input. This operates the "and" circuit 11 and provides an input for the "or" circuit 12 which latches the input data in the form of output signal 0 into the system. The removal of the signal X from the system, therefore, does not affect the output signal 0. It does, however, return the "and" circuit 10 to its non-operative condition. This applies a second negative going waveform to the "and" circuit 13 which, consequently, produces a negative output therefrom. This system will remain in that condition until the removal of the latching gate G which returns the systems to its original condition.

An inspection of the signal conditions of the input leads to the "or" circuit 12 will show that the race condition which previously existed is no longer present. This is because the addition of the "and" circuit 13 extends the duration of the signal from the "and" circuit 10 beyond the first time period. It does so by making the output of the "and" circuit 10 independent of the complement signal $\overline{G}$, whereby its duration becomes dependent upon the duration of the input data signal X.

Many other data latching systems having a variety of functions may be designed from the principles applicable to the basic system of FIG. 1. A number of these systems and the applicability of the present invention to them will now be described.

Figure 3:
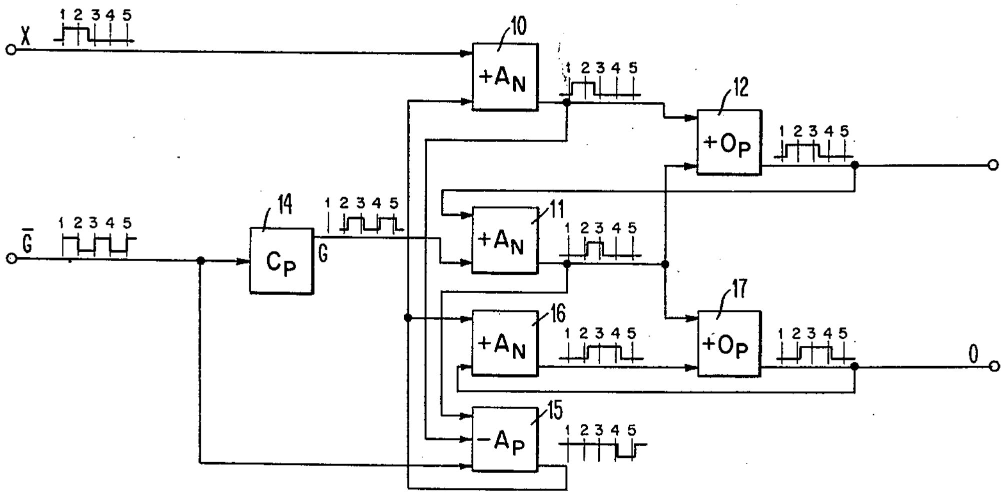
FIG. 3 is a logical block diagram of an escapement gate system in accordance with the invention.

The system illustrated in FIG. 3 is often referred to as an escapement gate. The similarity to the system of FIG. 2 is at once apparent. It includes the "and" circuits 10 and 11, the "or" circuit 12 and the race condition deterrents, convert circuit 14 and negative "and" circuit 15. It further includes, however, an "and" circuit 16 of the two-input type, and an "or" circuit 17. In addition, it will be noted that the negative "and" circuit 15 is of the three-input type thus differing from the negative "and" circuit 13 of FIG. 2.

The operation of the escapement gate may be divided into four intervals. During the first time interval, the data input signal X only is applied to the system. The negative "and" gate 15 cannot produce a negative going output signal during this interval due to the application of the positive going complement signal $\overline{G}$. It, therefore, provides a positive output which is applied to the "and" circuit 10, whereupon the "and" circuit 10 produces an output signal which is applied to the "or" circuit 12. This produces an output from "or" circuit 12 which in the illustrated case is not used as the output of the system, but only for its feedback function into the "and" circuit 11. As will become evident, an output may be taken from the "or" circuit 12 if desired. The "and" circuit 11 does not operate due to the absence of the latching gate signal G. Neither does the "and" circuit 16 operate since it does not receive positive going signals from the "or" circuit 17, which during this first time interval is in its non-operative condition, nor from the "and" circuit 15.

During the second time interval, the complement signal $\overline{G}$ is made negative, thereby producing the latching gate signal G. The "and" circuit 15, however, still provides a positive output signal and, consequently, the output of the "and" circuit 10 remains positive. The application of the latching gate signal G to the "and" circuit 11 now provides that "and" circuit with its second input. This operates the "and" circuit 11 and provides an input for the "or" circuit 12 and for the "or" circuit 17. The "or" circuit 17, accordingly, produces an output signal 0 which is utilized as the output signal of the system. The output signal 0 is also fed back to the input of the "and" circuit 16. The "and" circuit 16 derives its second input from the negative "and" circuit 15 and, therefore, produces an output signal which is applied to the "or" circuit 17. This locks the "or" circuit 17 into operation and thus latches the input data into the system. The signal X may now be removed from the system without affecting the output signal 0. It does, however, return the "and" circuit 10 to its non-operative condition. This applies a second negative going waveform to the "and" circuit 15. However, in this case, the "and" circuit 15 receives a positive going waveform from the "and" circuit 11 at its third input. Thus, the output of the "and" circuit 15 remains positive.

An escapement gate is characterized by being able to retain input data despite the removal of its latching gate signal. Accordingly, the third time interval of its operation is indicated by the removal of the latching gate signal G by making the complement signal $\overline{G}$ positive going. This makes the "and" circuit 11 non-operative and removes the input signal to the "or" circuit 12. This, in turn, makes the "or" circuit 12 non-operative. However, the removal of the gate signal G does not affect the operation of the "and" circuit 16, since the signal $\overline{G}$ is positive. Latching of the output signal 0 therefore continues.

The unlatching of the system is effected by a second application of the gate G which initiates the fourth time interval. This provides a negative going complement signal $\overline{G}$ which combines with negative going signals from the "and" circuits 10 and 11 to produce a negative going signal at the output of the "and" circuit 15. This, in turn, makes the "and" circuit 16 non-operative and removes from the "or" circuit 17 the signal derived therefrom. Furthermore, the "and" circuit 11 is not operated by the gate signal G due to lack of an input from the "or" circuit 12. Consequently, the "or" circuit 17 is made non-operative and the output signal 0 is no longer produced. Removal of the latching gate signal G then returns the system to its original condition.

It is evident that the "and" circuit 15 in the escapement gate performs the same service with respect to preventing a race condition as it does in the data latching system of FIG. 2. That is, it makes the duration of the output signal from the "and" circuit independent of the duration of the complement signal $\overline{G}$. Furthermore, in this case, the "and" circuit 15 is instrumental, through its connection to the "and" circuit 16, in unlatching the system.

It will be apparent to those skilled in the art that the escapement gate of FIG. 3 may also be utilized as an element for shifting data in one direction within a computer system.

Figure 4:
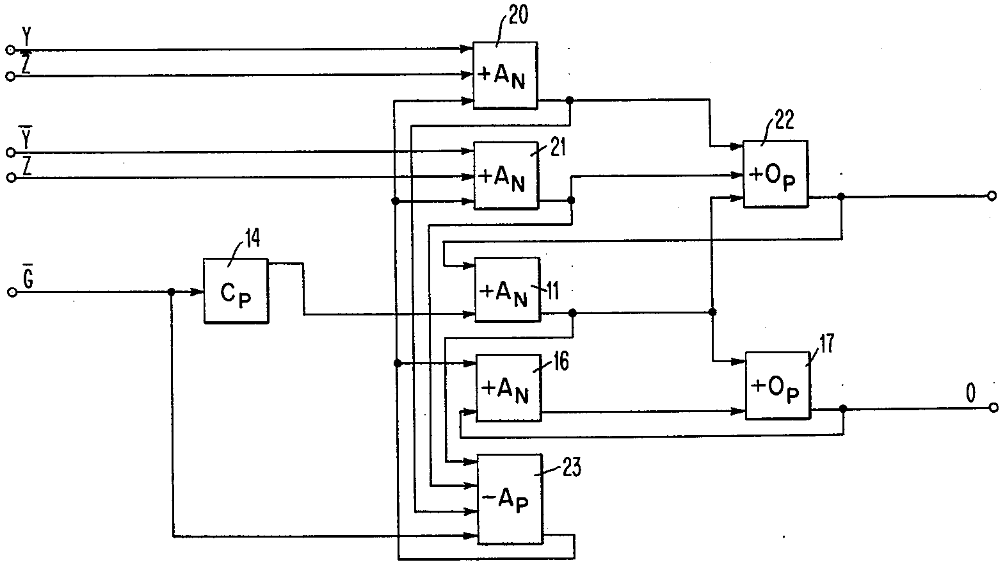
FIG. 4 is a logical block diagram of an exclusive "or" system in accordance with the invention.

Another data latching system which finds wide application is the exclusive "or" system illustrated in FIG. 4. This system is distinguished from the preceding two in that it utilizes four data input signals Y, Z, $\overline{Y}$ and $\overline{Z}$ to produce an output signal 0 only if the condition $Y \cdot \overline{Z} + Z \cdot \overline{Y}$ is satisfied; that is only if the signal Y and the complement of the signal Z are present, or if signal Z and the complement of the signal Y are present. To this end, the exclusive "or" system utilizes two three-input "and" circuits 20 and 21 in place of the single two-input "and" circuit 10 employed in the preceding systems. The remainder of the logic circuits which are not identical to those utilized before find their analog in the previously described systems. Thus, the "or" circuit 22 serves a function similar to that of the "or" circuit 12 but has an additional input in order to accommodate the output of the extra "and" circuit. Similarly, the negative "and" circuit 23 serves the same function as does the negative "and" circuit 15 but has an additional input to accommodate the additional "and" circuit.

The operation of the exclusive "or" system is readily understood when it is realized that only one of the "and" circuits 20 and 21 can be operative at any given time. This is due to the fact that the "and" circuit 20 is made responsive to the data input signals Y and $\overline{Z}$ while the "and" circuit 21 is made responsive to the data input signals $\overline{Y}$ and Z.

Accordingly, the operation of the exclusive "or" systems may be considered under two conditions. The first condition occurs when Y and Z are both present or $\overline{Y}$ and $\overline{Z}$ are both present. In that event, no output signal is produced by the system since neither of the "and" circuits 20 and 21 is operated. Consequently, the "or" circuit 22 cannot produce an output signal and, therefore, the "and" circuit 11 cannot be operated by the latching gate signal to trigger the sequence of operations characteristic of a data latching system.

The second condition occurs when either Y and $\overline{Z}$ or $\overline{Y}$ and Z are present. In that event, one of the "and" circuits 20 and 21 is operated. This initiates a sequence of operations which results in the latching and unlatching of the signal 0 at the output of the "or" circuit 17 in a manner identical to that described with respect to the escapement gate system of FIG. 3. That the manner of operation is identical in both cases may be appreciated by considering that the non-operated "and" circuit, either circuit 20 or 21, applies a negative signal to the "or" circuit 22 and to the negative "and" circuit 23 throughout the sequence of operations, thereby effecting the operation of neither.

The negative "and" circuit 23 serves, as the analog components in the previous embodiments, the function of preventing a race condition from arising in the system. In this case, however, it prevents the race condition from occurring between the signal out of the "and" circuit 11 and the signal out of either the "and" circuit 20 or the "and" circuit 21. Furthermore, as before, the negative "and" circuit 23 serves to unlatch the system.

It will be apparent to those skilled in the art that the exclusive "or" circuit of FIG. 4 may also be utilized as an element for shifting data either to the left or to the right in a computer system. In such application, one of the inputs of the "and" circuit 20, for example, may be connected to the output of a lower cell in the computer system while the other input is connected to a signal instruction of shift right. In that event, one of the inputs of the "and" circuit 21 should be connected to the output of a higher cell in the computer system while the other input is connected to a signal instruction of shift left. The latching gate signal G may then be utilized to effect the actual shift.

Figure 5:
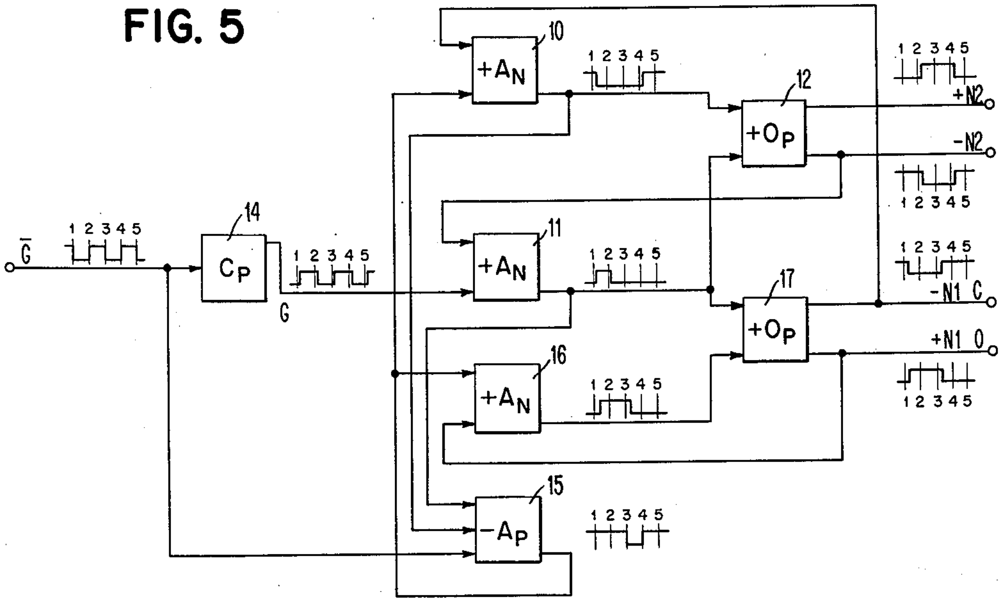
FIG. 5 is a logical block diagram of a binary trigger system in accordance with the invention.

Another system which derives from the data latching principle is the binary trigger system illustrated in FIG. 5. This system differs from the escapement gate of FIG. 3 only in that the input signal applied to the "and" circuit 10 is now the complement of the output signal 0 from the "or" circuit 17 as derived from its complementary output. With this exception, the operation of the binary trigger is identical to the operation of the escapement gate.

Accordingly, during the first time period of operation, prior to the application of a triggering or gating pulse G, "or" circuit 17 is not producing an output 0 and therefore its complementary output C is positive. The complementary output is fedback as one input to the "and" circuit 10. The other input is the feedback, initially positive, from "and" circuit 15. An input is applied to the "or" circuit 12 and therefore, initially, a positive output is developed at −N2, a negative output at +N2, a positive output at −N1 and a negative output at +N1.

Application of the first trigger pulse G renders "and" circuit 11 operating and therefore an input is applied to both "or" circuits 12 and 17. This serves to invert the outputs on both leads of the "or" circuit 17 but has no effect on the outputs of "or" circuit 12. The remaining sequence of operations may be observed from the following table:

| Triggering Pulse G: 0=Off, 1=On | +N2 | −N2 | +N1 | −N1 |
|---|---|---|---|---|
| 0 | − | + | − | + |
| 1 | − | + | + | − |
| 0 | + | − | + | − |
| 1 | + | − | − | + |

It is observed from the table that upon the application of the first triggering pulse, the pair of N1 outputs are inverted; that upon removal of the first triggering pulse, the output polarities of the N1 pair remain unaltered and the polarities of the N2 pair are inverted; and, upon application of the second triggering pulse, the output of the N2 pair is unaltered while the output of the N1 pair is reversed. In other words, the modified novel escapement gate provides in effect a double-trigger circuit; that is, the two pairs of outputs reverse in polarity in response to successive trigger pulses.

Figure 6:
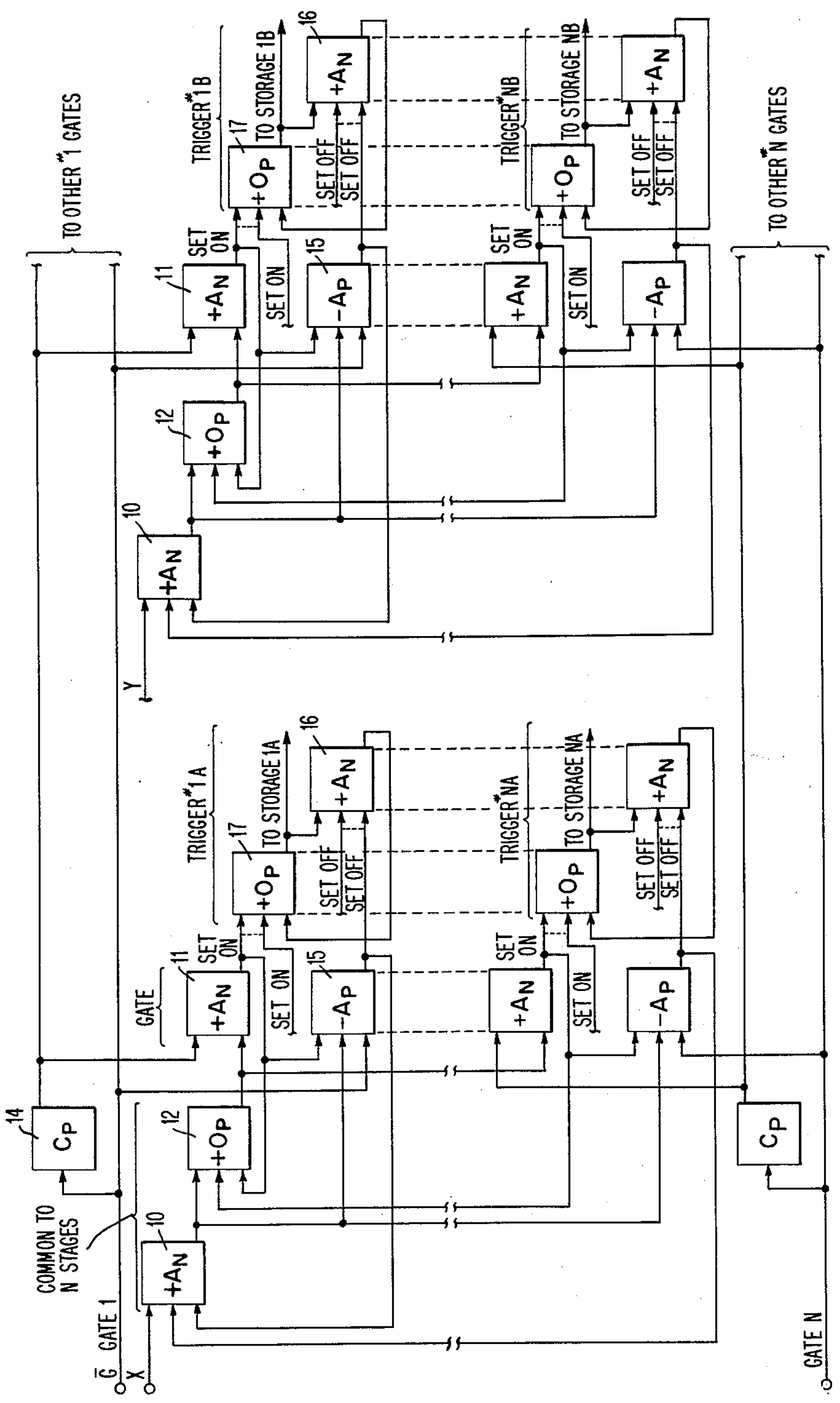
FIG. 6 is a block diagram of a selective gating system utilizing the escapement gate system of FIG. 3.

FIG. 6 illustrates an arrangement wherein the basic escapement gate of FIG. 3 may be utilized to perform selectively any one (or more) of several logical functions. For example, the arrangement may be utilized to effect selective gating into multiple storage, or multiple sources may be gated into a single trigger, or the arrangement may be utilized to permit single gate control for parallel entry into multiple triggers.

This embodiment of the invention is characterized by utilizing a portion of the escapement gate as a channel common to N gates and N storage devices. Although the logic blocks have been rearranged to show more simply the channel common to the N gates, the blocks have been given the same reference numerals as in the previous illustrations.

As seen in FIG. 6, the common channel comprises "and" block 10 and "or" block 12. The gate and trigger sections of the escapement gate are individual to each storage. Thus, the output from the single channel is selectively gated into a desired storage by application of a gate signal to the desired stage. For example, an output signal is supplied to storage "1A" by operation of gate 1.

Additionally, a single gate may control parallel data entry into multiple triggers. For example, data bits X and Y may be simultaneously gated into triggers 1A and 1B, respectively by application of a signal to the gate 1 line, or data bits X and Y may be simultaneously gated into triggers NA and NB by application of a signal to gate N line, etc.

By providing multiple set-on inputs to "or" circuit 17 and multiple set-off inputs to "and" circuit 16, the "or" and "and" circuit constituting a trigger, one of a group of data bits may be selectively entered into a single trigger. For example, data X may be entered into trigger 1A by application of suitable "set-on" signals to the trigger 1A and "set-off" signals to all the other triggers associated with the common channel.

It is to be understood that the above-described arrangements are simply illustrative of the application of the principles of the invention. Numerous other arrangements may be devised by those skilled in the art which embody the principles of the invention and fall within the spirit and scope thereof. For example, it is evident that the polarity of any individual logic circuit in the arrangement described was arbitrarily selected.

What is claimed is:

1. A data latching system comprising first, second and third logic circuits of at least the two-input type adapted to produce an output of given polarity in response to coincidence of predetermined inputs, a fourth logic circuit adapted to produce an output in response to an input, the output polarity of said third logic circuit being opposite of that of the other said logic circuits, the output of said first and second logic circuits being connected to said fourth logic circuit, one of the inputs of said first logic circuit being responsive to an input signal, one of the inputs of said second logic circuit being responsive to a gate signal, one of the inputs of said third logic circuit being responsive to the complement of said gate signal, another input of said first logic circuit being responsive to the output of said third logic circuit, another input of said second logic circuit being responsive to the output of said fourth logic circuit, and another input of said third logic circuit being responsive to the output of said first logic circuit.

2. A data latching system, comprising first, second and third logic "and" circuits of at least the two-input type, and a logic "or" circuit, the polarity of said third logic "and" circuit being opposite to that of the other said logic circuits, the outputs of said first and second "and" circuits being connected to said "or" circuit, one of the inputs of said first "and" circuit being responsive to an input signal, one of the inputs of said second "and" circuit being responsive to a gate signal, one of the inputs of said third "and" circuit being responsive to the complement of said gate signal, another input of said first "and" circuit being responsive to the output of said third "and" circuit, another input of said second "and" circuit being responsive to the output of said "or" circuit, and another input of said third "and" circuit being responsive to the output of said first "and" circuit.

3. A data latching system, comprising first, second and third logic circuits of the two-input type, adapted to produce an output of given polarity in response to coincidence of predetermined input, and a fourth logic circuit, adapted to produce an output in response to an input, the polarity of said third logic circuit being opposite to that of the other said logic circuits, the outputs of said first and second circuits being connected to said fourth circuit, one of the inputs of said first circuit being responsive to an input data signal, one of the inputs of said second circuit being responsive to a gate signal, one of the inputs of said third circuit being responsive to the complement of said gate signal, the other input of said first circuit being responsive to the output of said third circuit, the other input of said second circuit being responsive to the output of said fourth circuit, the other input of said third circuit being responsive to the output of said first circuit, and the output of said fourth circuit being the output of the system.

4. A data latching system, comprising first, second and third logic "and" circuits of the two-input type, and a logic "or" circuit, the polarity of said third logic "and" circuit being opposite to that of the other said logic circuits, the outputs of said first and second "and" circuits being connected to said "or" circuit, one of the inputs of said first "and" circuit being responsive to an input data signal, one of the inputs of said second "and" circuit being responsive to a gate signal, one of the inputs of said third "and" circuit being responsive to the complement of said gate signal, the other input of said first "and" circuit being responsive to the output of said third "and" circuit, the other input of said second "and" circuit being responsive to the output of said "or" circuit, the other input of said third "and" circuit being responsive to the output of said first "and" circuit, and the output of said "or" circuit being the output of the system.

5. A data latching system, comprising first, second and third logic circuits of at least the two-input type, adapted to produce an output of given polarity in response to coincidence of predetermined input, fourth and fifth logic circuits, adapted to produce an output in response to an input, and a sixth logic circuit of at least the three-input type adapted to produce an output of given polarity in response to coincidence of predetermined input, the polarity of said sixth logic circuit being opposite to that of the other said logic circuits, the outputs of said first and second circuits being connected to said fourth circuit, the outputs of said second and third circuits being connected to said fifth circuit, separate inputs of said first circuit being responsive to an input signal and to the output of said sixth circuit respectively, separate inputs of said second circuit being responsive to a gate signal and to the output of said fourth circuit respectively, separate inputs of said third circuit being responsive to the output of said fifth circuit and to the output of said sixth circuit respectively, and separate inputs of said sixth circuit being responsive to the complement of said gate signal, to the output of said first circuit and to the output of said second circuit respectively.

6. A data latching system, comprising first, second and third logic "and" circuits of at least the two-input type, first and second logic "or" circuits, and a fourth logic "and" circuit of at least the three-input type, the polarity of said fourth logic "and" circuit being opposite to that of the other said logic circuits, the outputs of said first and second "and" circuits being connected to said first "or" circuit, the outputs of said second and third "and" circuits being connected to said second "or" circuit, separate inputs of said first "and" circuit being responsive to an input signal and to the output of said fourth "and" circuit respectively, separate inputs of said second "and" circuit being responsive to a gate signal and to the output of said first "or" circuit respectively, separate inputs of said third "and" circuit being responsive to the output of said second "or" circuit and to the output of said fourth "and" circuit respectively, and separate inputs of said fourth "and" circuit being responsive to the complement of said gate signal, to the output of said first "and" circuit and to the output of said second "and" circuit respectively.

7. An escapement gate system, comprising first, second and third logic circuits of the two-input type, adapted to produce an output of given polarity in response to coincidence of predetermined input, fourth and fifth logic circuits, adapted to produce an output in response to an input, and a sixth logic circuit of the three-input type, adapted to produce an output of given polarity in response to coincidence of predetermined input, the polarity of said sixth logic circuit being opposite to that of the other said logic circuits, the outputs of said first and second circuits being connected to said fourth circuit, the outputs of said second and third circuits being connected to said fifth circuit, separate inputs of said first circuit being responsive to an input signal and to the output of said sixth circuit respectively, separate inputs of said second circuit being responsive to a gate signal and to the output of said fourth circuit respectively, separate inputs of said third circuit being responsive to the output of said fifth circuit and to the output of said sixth circuit respectively, separate inputs of said sixth circuit being responsive to the complement of said gate signal, to the output of said first circuit and to the output of said second circuit respectively, and the output of said fifth circuit being the output of the system.

8. An escapement gate system, comprising first, second and third logic "and" circuits of the two input type, first and second logic "or" circuits, and a fourth logic "and" circuit of the three-input type, the polarity of said fourth logic "and" circuit being opposite to that of the other said logic circuits, the outputs of said first and second "and" circuits being connected to said first "or" circuit, the outputs of said second and third "and" circuits being connected to said second "or" circuit, separate inputs of said first "and" circuit being responsive to an input signal and to the output of said fourth "and" circuit respectively, separate inputs of said second "and" circuit being responsive to a gate signal and to the output of said first "or" circuit respectively, separate inputs of said third "and" circuit being responsive to the output of said second "or" circuit and to the output of said fourth "and" circuit respectively, separate inputs of said fourth "and" circuit being responsive to the complement of said gate signal, to the output of said first "and" circuit and to the output of said second "and" circuit respectively, and the output of said second "or" circuit being the output of the system.

9. An exclusive "or" system, comprising first and second logic "and" circuits of at least the three-input type, third and fourth logic "and" circuits of at least the two-input type, first and second logic "or" circuits, and a fifth logic "and" circuit of at least the four-input type, the polarity of said fifth logic "and" circuit being opposite to that of the other said logic circuits, the outputs of said first, second and third "and" circuits being connected to said first "or" circuit, the outputs of said third and fourth "and" circuits being connected to said second "or" circuit, separate inputs of said first "and" circuit being responsive to a first signal, to the complement of a second signal, and to the output of said fifth "and" circuit respectively, separate inputs of said second "and" circuit being responsive to said second signal, to the complement of said first signal and to the output of said fifth "and" circuit respectively, separate inputs of said third "and" circuit being responsive to a gate signal and to the output of said first "or" circuit respectively, separate inputs of said fourth "and" circuit being responsive to the output of said second "or" circuit and to the output of said fifth "and" circuit respectively, and separate inputs of said fifth "and" circuit being responsive to the complement of said gate signal, to the output of said first "and" circuit, to the output of said second "and" circuit and to the output of said third "and" circuit respectively.

10. A binary trigger system, comprising first, second and third logic "and" circuits of at least the two-input type, first and second logic "or" circuits, and a fourth logic "and" circuit of at least the three-input type, the polarity of said fourth logic "and" circuit being opposite to that of the other said logic circuits, the outputs of said first and second "and" circuits being connected to said first "or" circuit, the outputs of said second and third "and" circuits being connected to said second "or" circuit, separate inputs of said first "and" circuit being responsive to the complementary output of said second "or" circuit and to the output of said fourth "and" circuit respectively, separate inputs of said second "and" circuit being responsive to a gate signal and to the output of said first "or" circuit respectively, separate inputs of said third "and" circuit being responsive to the output of said second "or" circuit and to the output of said fourth "and" circuit respectively, and separate inputs of said fourth "and" circuit being responsive to the complement of said gate signal, to the output of said first "and" circuit and to the output of said second "and" circuit respectively.

11. An arrangement for selectively transferring data from a source into a plurality of output devices, comprising a plurality of latching systems in accordance with claim 6, wherein said first "and" circuit and said first "or" circuit constitute a channel common to said plurality of output devices, said second "and" circuit and said fourth "and" circuit constitute a gate individual to each output device, and said third "and" circuit and said second "or" circuit constitute a trigger individual to each output device, whereby an input signal applied to said channel is selectively transferred to an individual trigger by application of a gating signal to the associated gate.

12. The arrangement according to claim 11, and further comprising a plurality of sources, each of which comprising a channel common to a unique group of output devices, and connections coupling corresponding gates in said unique groups of output devices, whereby a gating signal controls the transfer of multiple input signals to the associated output devices.

13. The arrangement according to claim 12, wherein said second "or" circuit and said third "and" circuit constituting said trigger comprise multiple "set-on" connections and multiple "set-off" connections respectively, there being a "set-on" connection and a "set-off" connection to each of said plurality of sources, and means for selectively entering an input signal from said plurality of sources into a single trigger by application of a "set-on" signal to all other triggers associated with the common channel.

14. A data latching system, comprising a source of input data, a source of gating signals, a first logic block conditioned for operation by input data applied to said system, a second logic block having two inputs, and adapted to produce an output in response to an input, one of said two inputs being coupled to the output of said first block, means for applying a gating signal to operate said first block and thereby supply an output to said second block, a third logic block having a pair of inputs and an output coupled to said second block, an output from said second block being fed back to one input of said third block, a fourth block having its output coupled to the other input of said third block and adapted to condition said third block for operation when receiving an output from said second block, whereby data is latched in the system by operation of said third block supplying an output to said second block.

15. A data latching system, comprising a source of input data, a source of gating signals, a first "and" logic block conditioned for operation by input data applied to said system, an "or" logic block having two inputs, one of which is coupled to the output of said "and" block, means for applying a gating signal to operate said "and" block and thereby supply an output to said "or" block, a second "and" block having a pair of inputs and an output coupled to said "or" block, an output from said "or" block being fed back to one input of said second "and" block, a third "and" block having its output coupled to the other input of said second block and adapted to condition said second "and" block for operation when receiving an output from said "or" block, whereby data is latched in the system by operation of said second "and" block supplying an output to said "or" block.

16. The system according to claim 15, wherein said second "and" block is of one polarity and said third "and" block is of the opposite polarity, the output from said third "and" block being adapted to condition said second "and" block for operation except when the inputs to said third "and" block are satisfied for operation thereof, whereupon the output thereof is adapted to cut off said second "and" block.

17. The system according to claim 16, and further comprising a source of gate complement signals, said third "and" block having three inputs, one input responding to a gate complement signal, a second input responding to the output of said first "and" block when the inputs to said first "and" block are not satisfied, and said third input responding to the absence of input data to said system, whereby when the three inputs to said third "and" block are responsive simultaneously, the output from said third "and" block maintains said second "and" block cut-off.

18. The system according to claim 17, wherein said second "and" block is of the positive type, said third "and" block is of the negative type, and said "or" block is of the positive type.

19. The system according to claim 18, wherein said "or" block further comprises an output for the system.

References Cited in the file of this patent

IBM Technical Disclosure Bulletin, vol. 1, No. 6, April 1959, "Sampling Gate," Maley, pp. 25, 26.